(12) United States Patent
Sahinoja et al.

(10) Patent No.: US 7,269,821 B2
(45) Date of Patent: Sep. 11, 2007

(54) METHOD AND DEVICE FOR MANAGEMENT OF TREE DATA EXCHANGE

(75) Inventors: Mikko Sahinoja, Tampere (FI); Rauno Hartikainen, Budapest (HU)

(73) Assignee: Nokia Corporation, Espoo (FI)

( * ) Notice: Subject to any disclaimer, the term of this patent is extended or adjusted under 35 U.S.C. 154(b) by 720 days.

(21) Appl. No.: 10/422,015

(22) Filed: Apr. 22, 2003

(65) Prior Publication Data
US 2003/0204640 A1 Oct. 30, 2003

(30) Foreign Application Priority Data
Apr. 30, 2002 (WO) ............... PCT/IB02/01441

(51) Int. Cl.
G06F 9/44 (2006.01)
G06F 15/177 (2006.01)
G06F 15/173 (2006.01)

(52) U.S. Cl. .................. 717/106; 709/222; 709/223; 715/734

(58) Field of Classification Search ........... 717/106; 709/226
See application file for complete search history.

(56) References Cited
U.S. PATENT DOCUMENTS

| | | | |
|---|---|---|---|
| 5,509,123 A | 4/1996 | Dobbins et al. | |
| 5,913,037 A | 6/1999 | Spofford et al. | |
| 6,046,742 A * | 4/2000 | Chari | 715/734 |
| 6,176,883 B1 | 1/2001 | Holloway et al. | |
| 6,748,448 B1 * | 6/2004 | Barrera et al. | 709/245 |
| 2003/0097433 A1 * | 5/2003 | Park et al. | 709/222 |

FOREIGN PATENT DOCUMENTS

EP 0996071 4/2000

OTHER PUBLICATIONS

"SyncML Device Management Tree and Description" Feb. 15, 2002 [online] retrieved from the Internet: http://www.syncml.org.

* cited by examiner

Primary Examiner—Tuan Dam
Assistant Examiner—Isaac T. Tecklu
(74) Attorney, Agent, or Firm—Ware, Fressola, Van Der Sluys & Adolphson LLP

(57) ABSTRACT

A management tree or nodes arranged hierarchically tree-like, respectively, is used to manage, contain and map information of a manageable device according to the SyncML DM protocol standard. A management server can request from such a device, by means of a GET command, information contained in a certain node of the management tree server. The manageable device responds by transmitting the requested information of the management tree. The inventive concept provides methods which allow a request of information not only from one single node but from a plurality of nodes at the same time. This leads to an efficient, time and cost saving management process.

26 Claims, 5 Drawing Sheets

METHOD AND DEVICE FOR MANAGEMENT OF TREE DATA EXCHANGE

CROSS REFERENCE TO RELATED APPLICATION

The present application claims priority under 35 U.S.C. § 365 and 35 U.S.C. § 119 from international application PCT/IB02/01441 filed Apr. 30, 2002.

BACKGROUND OF THE INVENTION

1. Technical Field

The present invention relates to a method for handling objects containing management information. In particular, the present invention relates to a method for exploring, i.e. for searching, the hierarchical structure and for retrieving preferably selectively information therefrom in an efficient way. Further, the present invention relates to devices adapted to operate the methods provided.

2. Discussion of Related Art

The synchronization of data is a well known problem for all users processing same data with at least two different electronic devices. In general, synchronization takes place between a terminal device (e.g., a mobile phone) and a server device (e.g., an application in a local PC or a dedicated synchronization server). Data of portable terminals, such as portable computers, PDA terminals (personal digital assistant), mobile stations or pagers, can be synchronized with network applications, applications of desktop computers or with other databases of the telecommunications system, wherein the term database should be understood as broadly as possible, i.e. shall cover arbitrary sets of data. In particular, data of calendar and e-mail applications are typically synchronized.

Synchronization has been based on the use of different manufacturer-specific protocols which are incompatible. This restricts the use of terminal or data types and often causes troubles to the user. In mobile communication, in particular, it is important that data can be retrieved and updated regardless of the terminal and application used.

To improve synchronization of application data, a language known as synchronization markup language SyncML, which is based on the extensible markup language (XML) and a corresponding standardized document type description (DTD), has been developed. By using a SyncML synchronization protocol, which employs messages in the SyncML format, data of any application can be synchronized between networked terminals and a network server of any kind. The SyncML synchronization protocol works both in wireless and in fixed networks and supports several transmission protocols.

The above presented SyncML synchronization technology addresses preferably the synchronization of databases. A problem similar to the synchronization of databases is given by the managing of configuration data properties necessary for the operation of electronic devices within changing environments, for example of mobile phone operating within mobile communication networks of different network carriers requiring individual carrier related sets of configurations e.g. network access point (NAP) definitions, address information of servers providing certain services such as short message service (SMS), multimedia message service (MMS) and the like. The SyncML device management relates to the harmonizing of configuration data. The respective configuration data or information is contained in management objects, respectively, associated to the device features and the applications, respectively.

SyncML device management (SyncML DM) protocol allows management commands to be executed on management objects and it uses a package format similar SyncML synchronization protocol and related definitions and is based also on XML. A management object might reflect a set of configuration parameters for a device, i.e. configuration parameters of device features and/or configuration parameters and settings of software applications executed on the device. Actions that can be taken against this object might include reading and setting parameter keys and values. Another management object might be the run-time environment for software applications on a device. Actions that can be taken against this type of object might include installing, upgrading, or uninstalling software elements. Preferably, dedicated management servers provide the required configuration parameters, settings, keys and values for synchronization of the device management information aforementioned.

The device management in accordance with the SyncML device management protocol structures the management objects in a hierarchical management tree containing all information which can be managed using the SyncML DM protocol. The management tree is based on a permanent part of the management tree defined and provided by the manufacturer of the respective electronic device supporting SyncML device management. The real management tree present in such an operated electronic device is composed of this permanent part of the management tree which is expanded by a dynamically created part of the management tree. The real management tree deviates in some way from a kind of pre-determined tree framework, i.e. deviates based on a kind of object-oriented inheritance.

The dynamical structure of the management tree makes it necessary to allow a device management server to explore the dynamic real management tree in order to allow it to operate and process thereon. Currently, such a management server is allowed to explore a management tree of a corresponding client device to be managed by sending a GET command defined in the SyncML DM standard. The GET command points it to a certain management object of the management tree. The corresponding response to that GET process is an information comprising a list of the management objects of the next level in the management tree subordinate to the addressed management object. The main drawback with this is that the management server has to issue a new Get command to retrieve further information of the management object below returned management objects if an extended list of management objects is wanted.

This takes a new protocol round which is time consuming. Particularly, since the SyncML and the SyncML DM standards are developed to be used in a wireless communication environment, i.e. a cellular communication system such as GSM (global system for mobile communication) or UMTS (universal mobile telecommunication system), online time and large amounts of exchanged data are expensive to the end-user of the client device who has to pay the costs being incurred.

DISCLOSURE OF INVENTION

One object of the invention is to provide an efficient, economical and time saving method enabling exploration of the management tree of a device and to overcome the drawbacks described above. A further object of the invention is to provide corresponding electronic devices adapted for performing the provided methods.

The objects of the invention are achieved with a method for generating a respective request command, a method for generating a corresponding request response, corresponding devices adapted to perform these methods, computer programs and software tools.

According to an embodiment of the invention, a method for generating a request for at least a part of management related information of an electronic device is provided. The management related information is contained in a plurality of nodes arranged as a hierarchical structure, preferably a tree-like structured. At least one of said nodes contains a certain part of the management related information. The generated request is obtained from a coding of an address information, a command and an additional information relating to the hierarchical structure of a plurality of nodes connected to the selected node. The address information describes one selected node of the plurality of nodes arranged hierarchically containing a certain part of the management related information. The command instructs a request receiving device to retrieve the part of management related information contained in the selected node and further instructs the request receiving device to return the retrieved part of management related information.

According to an embodiment of the invention, the command further instructs the request receiving device to retrieve the parts of management related information associated with the plurality of connected nodes and further instructs the request receiving device to return additionally these retrieved parts of management related information, preferably in combination with the retrieved part of management related information associated with the selected node.

According to an embodiment of the invention, the plurality of connected nodes are nodes which are arranged hierarchically above or hierarchically below the selected node in the management tree formed by the total plurality of nodes.

According to an embodiment of the invention, the information relating to the hierarchical structure of a plurality of nodes connected to the selected node contains further filter information. The filter information is used to selectively retrieve parts of management related information from the nodes. The filter information may be a composition of single filter information combined by logical relationships offering a complex filtering on the management related information or in combination with the retrieving operation of the management related information.

According to an embodiment of the invention, the information relating to the hierarchical structure of a plurality of nodes connected to the selected node is contained in the address information. Further, the filter information can also be contained in the address information.

According to an embodiment of the invention, the information relating to the hierarchical structure of a plurality of nodes connected to the selected node is an instructional sequence. The instructional sequence is to be decoded and pared by the means of a CGI-script application.

According to an embodiment of the invention, the request is based on the synchronization markup language device management (SyncML DM) protocol or standard, respectively.

According to an embodiment of the invention, the command of the request is a modified GET command. The modification is performed by coding a modified TARGET address in the GET command containing the information relating to the hierarchical structure of a plurality of nodes connected to the selected node.

According to an embodiment of the invention, a method for generating a response containing management related information is provided. The response is generated in consequence of a receipt of a request for at least a part of management related information from a requesting electronic device. The management related information is associated with and distributed among a plurality of nodes arranged as a hierarchical structure, preferably a tree-like structure. At least one of said plurality of nodes is associated with a certain part of the management related information. The generation of the section comprises retrieving of a part of management related information from one selected node. This selected node is defined directly in an address information coded in the response causing request. The generation of the response comprises further a generating of a section of the response which contains the retrieved part of management related information of the selected node. Preferably the generation comprises additionally an identifying of nodes designated by information relating to the hierarchical structure of a plurality of nodes connected to the selected node. This information is also contained and provided by the response causing request. Further parts of management related information from the identified nodes are retrieved and additionally added to the generated response. Finally the response is transmitted to the requesting device.

According to an embodiment of the invention, the request causing the response is a request according to the aforementioned method for generating a request for at least a part of management related information of a request receiving electronic device.

According to an embodiment of the invention, the plurality of connected nodes are nodes which a arranged hierarchically above or hierarchically below the selected node in the management tree formed by the total plurality of nodes.

According to an embodiment of the invention, the information relating to the hierarchical structure of a plurality of nodes connected to the selected node contains further filter information. The filter information are used to selectively retrieve parts of management related information from the identified nodes. The filter information may be a composition of single filter information combined by logical relationships offering a complex filtering on the management related information or in combination with the retrieving operation of the management related information.

According to an embodiment of the invention, the information relating to the hierarchical structure of a plurality of nodes connected to the selected node is contained in the address information. Further, the filter information can also be contained in the address information.

According to an embodiment of the invention, the information relating to the hierarchical structure of a plurality of nodes connected to the selected node is an instructional sequence. The instructional sequence is to be decoded and paired by the means of a CGI-script application.

According to an embodiment of the invention, the response is structured in a plurality of single sections. Each section is dedicated to the management related information contained in a node and retrieved therefrom.

According to an embodiment of the invention, the response contains a RESULTS element containing a plurality of ITEM elements. Each of the plurality of ITEM elements contains management related information of one identified node.

According to an embodiment of the invention, each of the plurality of ITEM elements are coded as if a request response to a GET-command has been generated addressing the respective node corresponding to the ITEM element.

According to an embodiment of the invention, a software tool for handling management related information is provided. The software tool comprises program portions for carrying out the operations of the aforementioned methods when the software tool is implemented in a computer program and/or executed.

According to an embodiment of the invention, there is provided a computer program for handling management related information. The computer program comprises program code portions for carrying out the operations of the aforementioned methods when the program is executed on a processing device, a computer or a network device.

According to an embodiment of the invention, a computer program product is provided which comprises program code portions stored on a computer readable medium for carrying out the aforementioned methods when said program product is executed on a processing device, a computer or network device.

According to an embodiment of the invention, a device for generating a request for at least a part of management related information of a request receiving electronic device is provided. The management related information is distributed among a plurality of hierarchically structured nodes, preferably tree-like structured, wherein at least one of said plurality of nodes is associated with a certain part of the management related information. The device comprises a component for generating the request. The component for generating is able to code an address information of a selected node of the plurality of nodes and is further able to code a command for instructing retrieval of the part of management related information associated with the selected node and to return the retrieved part of management related information. Further the component for generating is also able to code an information relating to the hierarchical structure of a plurality of nodes connected the selected node.

According to an embodiment of the invention, the device or the component for generating is adapted, respectively, to perform the aforementioned method for generating a request for at least a part of management related information of a request receiving electronic device.

According to an embodiment of the invention, a device for generating a response containing management related information is provided. The response is generated as a consequence of receipt of a request for at least a part of management related information from a requesting electronic device. The management related information is contained in the device. Further, the management related information is distributed among a plurality of hierarchically structured nodes, preferably tree-like structured, wherein at least one of the plurality of nodes is associated with a certain part of the management related information. The device comprises a component for retrieving a part of management related information from one selected node. This selected node is defined in an address information provided by the request. Further the device comprises a component for generating the response which contains the retrieved part of management related information.

Additionally, the device comprises a component for identifying nodes designated by information relating to said hierarchical structure of a plurality of nodes connected to said selected node. This information is also defined and provided by the received request. The component is additionally adapted to retrieve parts of management related information from the identified nodes. The parts of management related information are associated with these identified nodes. Finally a component for adding additionally enables adding the retrieved parts of management related information to the response. The response is transmitted to the requesting electronic device.

According to an embodiment of the invention, the device comprises additionally a CGI-script decoding component for decoding an instructional sequence based on a CGI-script instruction. This instructional sequence contains the information relating to said hierarchical structure of a plurality of nodes connected to the selected node.

According to an embodiment of the invention, the device or the component for generating is adapted, respectively, to perform the aforementioned method for generating a response containing management related information.

BRIEF DESCRIPTION OF THE DRAWINGS

The invention will be described in greater detail by means of embodiments with reference to the accompanying drawings, in which.

BEST MODE FOR CARRYING OUT THE INVENTION

Figure 1:
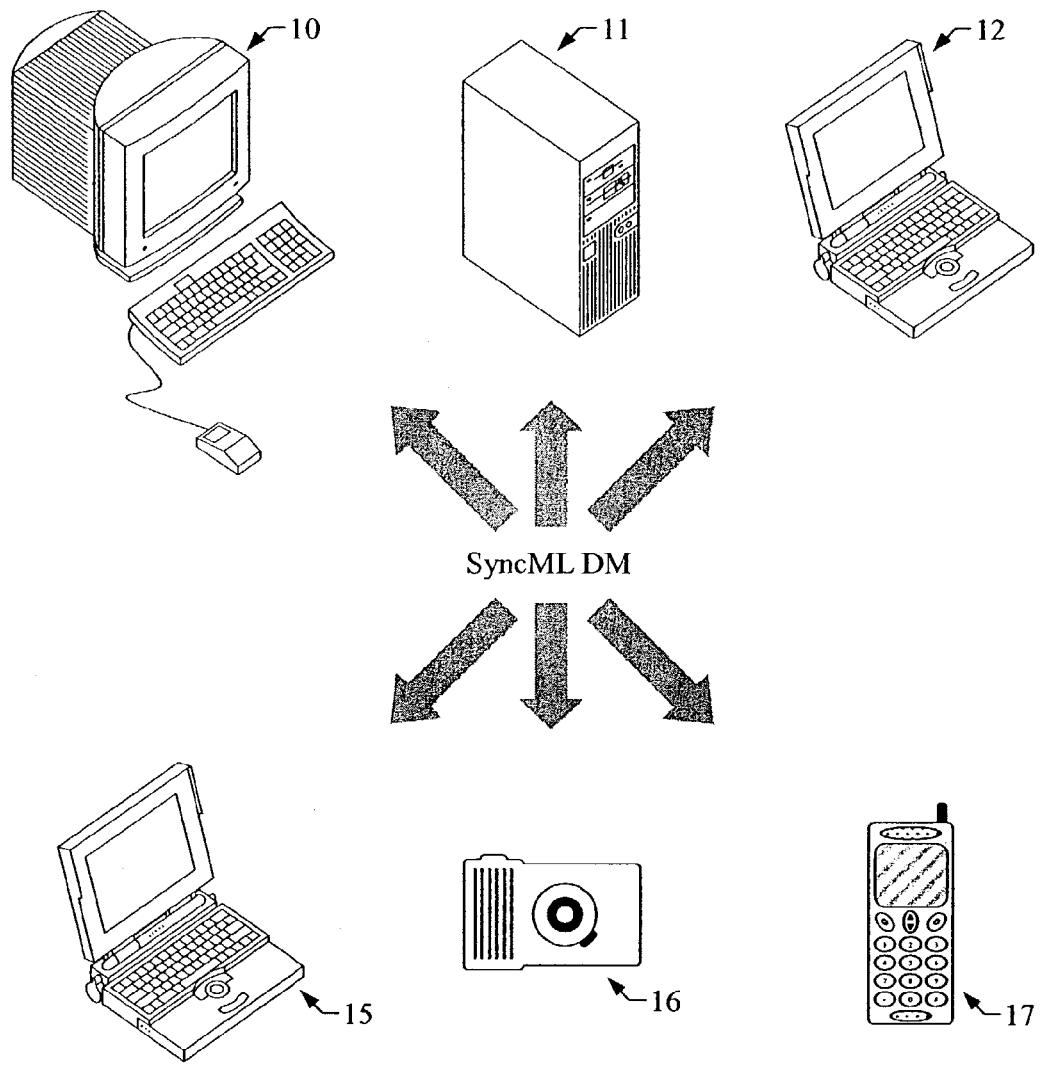
FIG. 1 shows a schematic diagram illustrating a set of exemplary electronic devices between which synchronization of information can be effected.

In the following, the embodiments of the invention will be described in a system supporting the SyncML device management standard or the related SyncML standard without limiting the invention thereto. Information about the SyncML standard and the SyncML device management standard can be obtained from the SyncML Initiative providing publicly the full standard documentation. Same or equal parts, features and/or operations shown in the figures will be referred to using the same reference numerals.

FIG. 1 shows a schematic diagram illustrating a set of exemplary electronic devices between which synchronization of information can be effected. A certain database content of preferably mobile terminals shall be harmonized with database content provided by designated devices.

Conventionally, mobile terminals act as synchronization clients harmonizing or synchronizing certain pre-defined data with the contents of a database or several databases provided by dedicated server devices. FIG. 1 illustrates a plurality of possible client devices and server devices for the synchronization operation. Typically, client devices are mobile stations like mobile phones 17 or personal digital assistants (PDA), mobile computers like notebooks 15, digital cameras 16 or personal computers (PC). Further, dedicated synchronization server devices may be desktop computers like a personal computer 10, a dedicated network server 11 or even a mobile computer like a notebook 12. It should be noted that the client device functionality is not limited to mobile terminals as described above although the presented concept of synchronization is described in view of mobile terminals connected to dedicated serving devices.

A corresponding synchronization process in accordance with the SyncML protocol standard or the SyncML device management protocol standard, respectively, may be established via an appropriate logical communication connection. The logical communication connection may be provided by any communication networks in combination with transport protocols to which the synchronization protocol is adapted. A suitable communication network may be a local area network (LAN), a wide area network (WAN) which may comprise the internet and an intranet of a company but also wire-based serial networks such as universal serial bus (USB) or standardized serial communication (e.g. RS-232). The participating synchronization devices may also be connected via a wireless communication network such as a mobile network supporting global system for mobile communication (GSM) services and/or supporting general packet radio services (GPRS), a third generation mobile communication network such as a universal mobile telecommunication system (UMTS) network, a wireless local area network (WLAN), a Bluetooth network or an infrared network (IrDA). The logical communication connection between the participating synchronization devices may be provided by a single communication network of the aforementioned type but also may be provided by several communication networks of the aforementioned types interconnected by dedicated network routing devices.

With respect to the SyncML protocol standard the SyncML synchronization protocol and hence also with respect to the SyncML device management protocol standard the SyncML device management protocol can be implemented on the top of appropriate protocols in accordance with the type of employed communication network. Appropriate protocols on top of which the SyncML synchronization protocol can be implemented are the hyper text transfer protocol (HTTP), the wireless session protocol (WSP) of the wireless application protocol (WAP) standard, the object exchange protocol (OBEX) used for cable connections, such as universal serial bus (USB) or RS-232, for short-range radio frequency connections (Bluetooth) or for infrared connections (IrDA), the transport control protocol/internet protocol (TCP/IP) stack and on top of the transport layer service which is offered by the e-mail protocol (e.g. simple mail transfer protocol, SMTP).

Transfer at the lower layer can be performed according to the underlying network using e.g. short messages SMS (short message service) or other signaling type transmission methods (e.g. USSD; unstructured supplementary service data), circuit-switched data calls or packet-switched data transfer services.

Whereas the description above referred to a general synchronization and therefore also to the device management synchronization, the following description of the innovative concept will refer explicitly to the SyncML DM protocol.

The SyncML device management service itself is based on the exchange of a management document, which may be divided into a plurality massages or packages, respectively, comprising instructions in order to synchronize the device management data. SyncML DM Protocol consists of two parts: setup phase comprising authentication and device information exchange and management phase. The management phase can be repeated as many times as the server wishes.

The management phase comprises a number of protocol iterations, i.e. protocol iteration means a package from a managed client device to a management server and a package from a management server to a managed client device. The content of a package sent from the management server to the managed client device determines whether the session must be continued or not. If the management server sends management operations in packages that need responses (status or results) from the managed client device, the management phase of the protocol continues with a new package from the managed client device to the management server containing client responses to management operations. A response package from a managed client device starts a new protocol iteration. The management server can send a new management operation package and therefore initiate a new protocol iteration as many times as it wishes.

An exemplary and valid total sequence of packages in accordance with the setup phase and the management phase is described in the following section in order to provide a coarse overview of the package exchange.

Package 0—initiation of the management session: Most managed client devices can receive unsolicited messages, sometimes called "notifications". A management server can use this notification capability to cause the client to initiate a connection back to the management server, several bearers can be used for transmitting management initiation notifications. Note that an identical effect to receiving a management initiation notification can be caused in other ways.

Package 1—initialization from managed client device to management server: The purpose of the initialization package sent by the managed client device is:
  to send managed client device information (like manufacturer, model, etc.) to a device management server,
  to identify the managed client device to the management server,
  to inform the server whether the management session was initiated by the server (by sending a trigger in Package 0) or by the client (like end user selecting a menu item).

Package 2—initialization from management server to managed client device: The purpose of the initialization package sent by the management server is:
  to identify the device management server to the managed client device,
  to send optionally management commands and management data to the managed client device,
  to send optionally further commands like user interaction commands.

Packages 1 and 2 are part of the setup phase of the management process. Following packages 3 and 4 are part of the management phase of the management session.

Package 3—managed client device response to management server: The purpose of this management package is:
  to transmit results of the management commands sent from the management server to the managed client,
  to transmit results of optional user interaction commands.

Package 4—further management server operations: The purpose of this management package is:
  to transmit any further necessary management operations or commands from the management server to the managed client, respectively, or
  to close the management session.

A package 4 containing further management operations causes a response of the package 3 kind by the managed client device. Hence, the management session can comprise an arbitrary number of iterations of the packages 3 and 4.

SyncML DM protocol uses the authentication framework provided by the SyncML standard, with some extensions defined in SyncML device management security. Both a SyncML DM Protocol managed client device and a management server have to be authenticated to each other. Authentication can be performed at different levels, however. If the transport level has a built-in authentication mechanism SyncML DM protocol-level authentication may be replaced thereby. If the transport level does not have a sufficiently strong authentication feature, SyncML DM Protocol-level authentication is to be used.

Figure 2A:
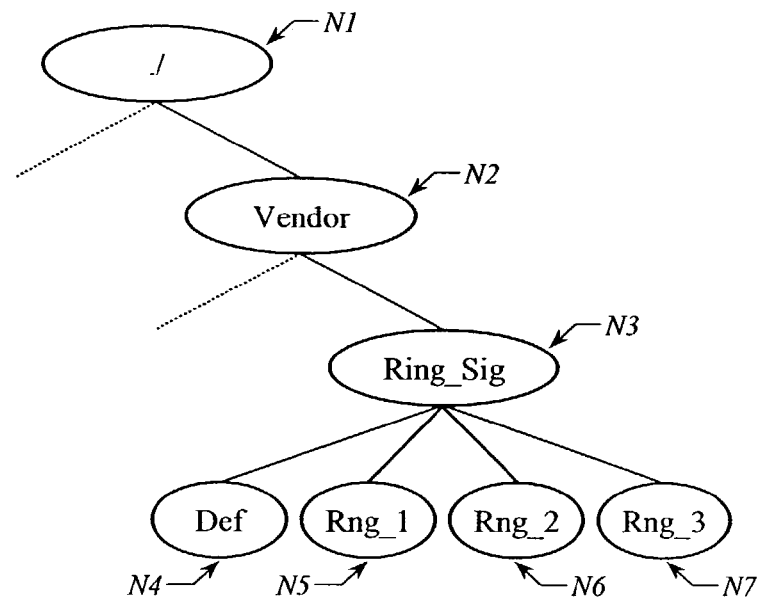
FIG. 2a shows a diagram illustrating an exemplary excerpt of a hierarchical tree-like structure of device management information.
Figure 2B:
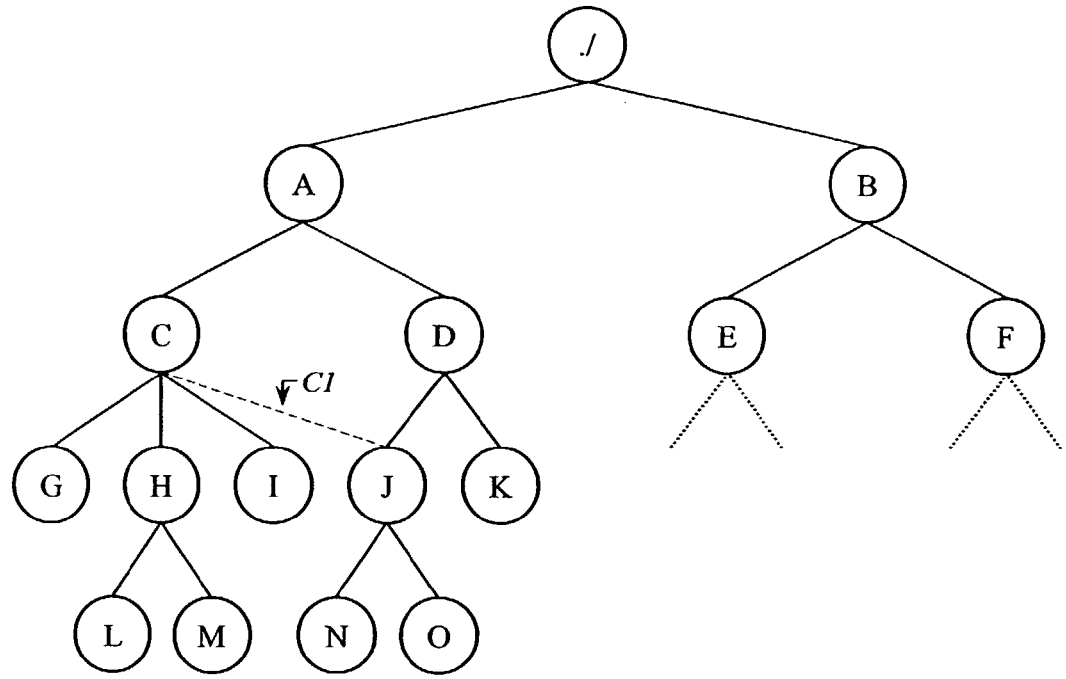
FIG. 2b shows an abstract diagram illustrating exemplary excerpts of hierarchical tree-like structures of device management information.

The FIGS. 2a and 2b show diagrams illustrating exemplary excerpts of hierarchical tree-like structures of device management information, i.e. the management trees. Each device supporting the SyncML DM protocol contains such a management tree. The management tree arranges the complete management information divided into a plurality of management objects in the manageable device as a hierarchical tree-like structure where all management objects can be uniquely addressed with a uniform resource indicator (URI).

The single management objects of a management tree are illustrated in the FIGS. 2a and 2b using circularly shaped or elliptically shaped text boxes. Further, the relationships between the management objects are illustrated using interconnecting lines. In the following, the management objects will be termed as nodes.

FIG. 2a shows a diagram illustrating as an example an excerpt of a hierarchical tree-like structure of device management information. The illustrated except of the exemplary management tree contains a root node N1 termed as "./". This root node has (contains) a child node N2 indicated by the connecting line. This child node N2 of the root node N1 is termed as "Vendor". Dashed styled connecting lines shall imply further not illustrated nodes of the management tree. The node N2 termed as "Vendor" has (contains) again a node N3 termed as "Ring_Sig" and subordinately arranged. Further the node N3 termed as "Ring_Sig" has (contains) again itself a plurality of sub-nodes, the nodes N4, N5, N6 and N7, respectively, termed as "Def", "Rng_1", "Rng_2" and "Rng_3", respectively.

The addressing of the nodes or management objects, respectively, is preferably based on uniform resource indicator (URI), wherein a unique address is constructed by starting at the root node and as the management tree is traversed down to the node in question, each node name is appended to the previous ones using a delimiting character, normally "/". For example the node N6 termed as "Rng_2" can be uniquely addressed by using the expression "./Vendor/Ring_Sig/Rng_2".

FIG. 2b shows an abstract diagram illustrating exemplary excerpts of hierarchical tree-like structures of device management information. FIG. 2b illustrates two excerpts based on the same nodes. The first excerpt of a hierarchical tree-like structure of device management information can be recognized by taking account only the continuous lines, whereas the second excerpt of a hierarchical tree-like structure of device management information can be recognized by taking account of the continuous lines and additionally especially dashed line C1. The following examples provided in the description of the embodiments of the invention will be given with reference to this illustrated abstract management tree, especially to the illustrated first excerpt of the abstract management tree.

The following statements relate to the general definition of the management tree and the nodes or management objects, respectively, arranged hierarchically and contained in the management tree.

Nodes or management objects, respectively, are the entities which can be manipulated by management actions carried over the SyncML DM protocol. A node can contain related objects being as small as an integer or as large and complex as a background picture or screen saver. The SyncML DM protocol is agnostic about the contents, or values, of the nodes and treats the node values as opaque data.

A node can have an unlimited number of child nodes linked to it in such a way that the complete collection of all nodes in a management database forms a tree-like structure as shown in FIG. 2a and the following FIG. 2b. Further each node or management object has properties associated with it.

Properties of nodes are used to provide meta information about the node in question. Preferably, the properties described in the following section are run-time properties, e.g. they are available during the lifetime of their associated node. The possible properties may be comprised in following property definitions without any guarantee of completeness:

| | |
|---|---|
| ACL | Access control list |
| Format | Specifies how node values should be interpreted |
| Name | The name of the node in the tree |
| Size | Size of the node value in bytes |
| Title | Human readable name |
| Tstamp | Time stamp, date and time of last change |
| Type | The MIME type of the node |
| VerNo | Version number, automatically incremented at each modification |

As mentioned before the complete structure of all nodes (management objects) and the root node (i.e. the managed client device itself) forms a tree. Management servers can explore the structure of the tree by using the GET command. Conventionally, if an accessed node has child nodes linked to it the name of these child nodes are returned as a result of the GET command. Nodes or management objects, respectively, that have one or more child objects are called interior objects. Nodes or management objects, respectively, without any children are called leaf objects. Leaf objects have manageable values and interior objects have child objects.

The nodes illustrated in FIG. 2b can be distinguished by the classification of interior objects and leaf objects. The root node can be identified by the mark "./" which is in accordance with the classification an interior object, the nodes being interior objects can be identified by the marks "A", "B", "C", "D", "E", "F", "H" and "J", whereas the remaining nodes are leaf objects which can be identified by the marks "G", "I", "K", "L", "M", "N" and "O".

Referring to the first excerpt of the depicted management tree taking account only of the continuous lines, the depicted excerpt shows a strict hierarchical tree-like structure, i.e. each child node or child object, respectively, is linked to one parent object or parent node, respectively. This kind of strict hierarchical tree-like structure is usually known from science, for example for classifying e.g. the fauna of the earth into classes such as vertebrates and invertebrates.

In contrast thereto, referring to the second excerpt of the depicted management tree taking account of the continuous lines and additionally especially dashed line C1, a depicted excerpt shows a hierarchical tree-like structure which allows a child node to be linked to two parent nodes, i.e. two nodes may have a link to the same subordinate node. Such a hierarchical tree-like structure allowing cross links is known from hierarchically tree-like structured databases or hierarchically tree-like structured menus.

The management tree can be extended at run-time by the management server or by the managed client device itself, e.g. as a result of user interaction. This is done with adequate commands and both new interior objects and new leaf objects can be created. However, the parent of any new node has to be an existing interior object.

The run-time extension of the management tree makes it necessary to provide an efficient and fast method for exploring the management tree which preferably reduces or saves the total amount of throughput of amount of transmitted data, respectively. The inventive concept and hence the following descriptions of methods according to embodiments of the invention provides such efficient methods.

Figure 3:
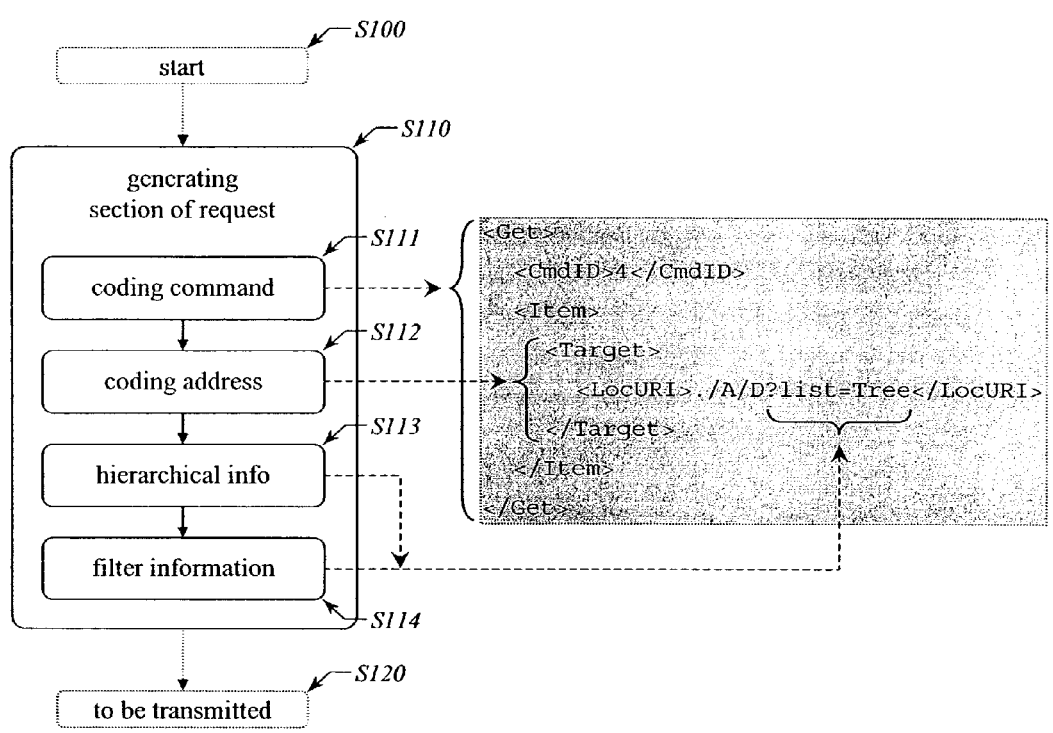
FIG. 3 shows a flow diagram illustrating the method for generating a request according to an embodiment of the invention in combination with an exemplary code sequence.

FIG. 3 shows a flow diagram illustrating the method for generating a request according to an embodiment of the invention in combination with a corresponding exemplary code sequence.

In an operation S100, a generation of a request or of a section of the request is started, respectively. Preferably, this request shall serve to explore the run-time or dynamical structure of a management tree of a managed client device and shall be generated by a management server. The request may be part of the management phase described with reference to FIG. 1. Advantageously, the request is package type 3 request. The request serves to initiate a request response of the package type 4.

A request in accordance with the SyncML DM protocol has to fulfill some structural requirements. A SyncML DM protocol message is a well-formed extended markup language (XML) document identified by the SyncML DM root or document element type. The document consists of a header and a body. The header specifies over all routing and versioning information, while the body is a container for one or more SyncML DM instructions. The instructions are containers for other element types that describe the specifics of the instruction, including any device management data or meta-information. Incorporated here, too, are features such as SyncML DM data formats and SyncML DM capabilities exchange are incorporated.

In an operation S110, the request or the section of the request is generated, respectively. The section relates to the exploring of the management tree contained in the managed client device. Particularly, this request section relates to the coding of the command according to the inventive concept of the present invention. More particularly, this request section relates to the coding of a modified GET command. The basic GET command is defined and provided by the SyncML DM protocol standard.

In an operation S111, a corresponding command is coded which indicates to the receiving managed client device to explore the management tree and to return information in accordance with results obtained by this exploration. Preferably, the corresponding command is a modified GET command. The modified GET command is composed of a standard GET command extended by tree exploring related information and filter information.

As shown in exemplary FIG. 3, the GET command is composed of an initial term "<Get>" and a final term "</Get>" basing on the XML formulation of the command or the total request, respectively. Further the initial and final terms include a command identification number included in an initial term "<CmdID>" and a final term "</CmdID>" and an ITEM definition included in an initial term "<Item>" and a final term "</Item>"

In an operation S112, an address information is coded. The address information contains an address, preferably a URI coded address, addressing a node or a management object of the management tree, respectively, contained in the managed client device. This address information is coded in a TARGET definition included in an initial term "<Target>" and a final term "</Target>" which again includes the address information based on a URI expression included in an initial term "<LocURI>" and a final term "</LocURI>".

In an operation S113 and in an operation S114, the extending tree exploring related information and filter information are coded additionally within the GET command structure described above. Preferably, the tree exploring related information is an information relating to the hierarchical structure of the management tree defining how to explore the management tree, i.e. which node or management objects shall be identified for retrieving information thereof, respectively. Advantageously, the tree exploring related information and filter information are coded within the address information, more advantageously the information is appended to the address information based on a URI expression.

The exploring related information and filter information is coded within a string sequence which is decoded by the means of a CGI-script. The CGI-script based mechanism provides an adequate method in view of the coding and decoding of the information. The coding sequence is a simple string sequence initialized by a character "?" in order to delimit the CGI-script based sequence and the URI based address sequence. The expression "list=" indicates to the parsing and responding managed client device to explore the contained management tree and retrieve corresponding information from the explored part of the management tree or the explored node or management object, respectively. The exemplary expression "list" is merely a matter of choice so that it should be understood that the presented method according to an embodiment of the invention shall not be limited thereto. Alternatively, an arbitrary expression can be chosen, e.g. instead of expression "list" the string "node", "nodes" or the like may be selected. A meaningful expression of course improves the readability of the modified GET command.

The exploration related information and the filter information are coded in the remaining part of the CGI-script expression, here the expression "tree". This expression "tree" indicates to explore all sub-nodes arranged below or subordinately to the addressed node. Further, the expression "tree" implies to retrieve the names of the explored sub-nodes and to return this retrieved information. The expression "tree" defines the exploration related information as well as the filter information. Further examples of exploration related information and the filter information will be given below.

In an operation S120, the generating or coding of the request is finalized, e.g. in accordance with the SyncML DM protocol standard. Further commands can be included in the request subordinate or superordinate to the described modified GET command section. The finalized request is transmitted to the managed client device.

As described above, the exploration related information and the filter information are coded in the modified GET command by providing a string expression to be decoded by a CGI-script mechanism. The string expression contains an initial pre-defined sequence "list" delimited by a character "=" from at least one parameter defining the exploration related information and the filter information. The following list contains a number of exemplary parameter definitions in order to provide a view to possibilities provided by the inventive concept.

Parameters and resulting responses instructed by the parameters:

| | |
|---|---|
| Tree | names of all sub-nodes below the addressed node are returned, |
| Two | names of all sub-nodes up to two levels below the addressed node are returned, |
| Three | names of all sub-nodes up to three levels below the addressed node are returned, |
| "N" | names of all sub-nodes up to n levels below the addressed node are returned (wherein "N" shall be understood to be written out in full), |
| Up | names of all sub-nodes above the addressed node are returned, |
| Depth | a depth of the management tree below the addressed node is returned, |
| Data | data of leaf objects below the addressed node is returned, |
| ACL | a list of access control list of sub-nodes below the addressed node is returned, |
| Type | a list of MIME types of sub-nodes below the addressed node is returned, |
| Format | a list of format of sub-nodes below the addressed node is returned, |
| Size | a list of size information of sub-nodes below the addressed node is returned, |
| Title | a list of human readable names of sub-nodes below the addressed node is returned, |
| TStamp | a list of time stamp of sub-nodes below the addressed node is returned, |
| VerNo | a list of version numbers of sub-nodes below the addressed node is returned |

The defined parameters may be combined using logical linking of at least two parameters. A logical AND linking may be indicated by coding a linking mark "&" between these at least two parameters. For example an exemplary modified GET command definition basing on the modified GET command illustrated in FIG. 3 is coded as follows:

```
<Get>
    <CmdID>4</CmdID>
    <Item>
        <Target>
            <LocURI>./A/D?list=Tree&ACL</LocURI>
        </Target>
    </Item>
</Get>
```

The CGI-script sequence is indicated by bold letters. The two parameters "Tree" and "ACL" are combined by a logical AND linking. This sequence instructs the receiving managed client device to return both names of the sub-nodes and the access list sequence values arranged in the management tree subordinate to the addressed node.

The logical AND linking coded by a character mark "&" is one possible logical linking. Similarly, a logical OR linking or a logical NOT linking but also logical prioritizing e.g. by the use of bracket marks "(" and ")" may be offered for coding. Further, the purposed logical linking is not limited to the linking of two parameter, i.e. several parameters may be combined by logical linking for example represented by corresponding character marks Further additional filter parameters may be offered for coding the filter information. Such additional filter parameters can be added to the aforementioned parameters using the logical linking described above. The additional filter parameters may be indicated by using a pre-defined initial sequence, e.g. the string sequence "filter" and again a delimiting character "=" to allow the unambiguous separation of the sequence during the CGI-script decoding or parsing, respectively.

An exemplary CGI-script sequence may have the expression "?list=Tree&filter=std". The filter parameter "std" instructs only to return name of sub-nodes (compare with definition of parameter "tree") that are standardized in the SyncML DM protocol standard. A further exemplary filter parameter may offer the possibility to indicate to the receiving managed client device only to return data retrieved from the nodes in accordance with the tree exploration related information that are smaller than a specified size, e.g. 10 kbit, preferably the retrieved data is data retrieved from the leaf objects of the management tree. This would be expressed preferably by the CGI-script sequence "?list=Data&filter=10000".

The flow sequence illustrated in FIG. 3 describes the coding of a command instructing a managed client device according to an embodiment of the invention to return certain specified information retrieved from the management tree contained in the managed client device. The following FIG. 4 is dedicated to the generation of the result caused by such a request according to an embodiment of the invention.

Figure 4:
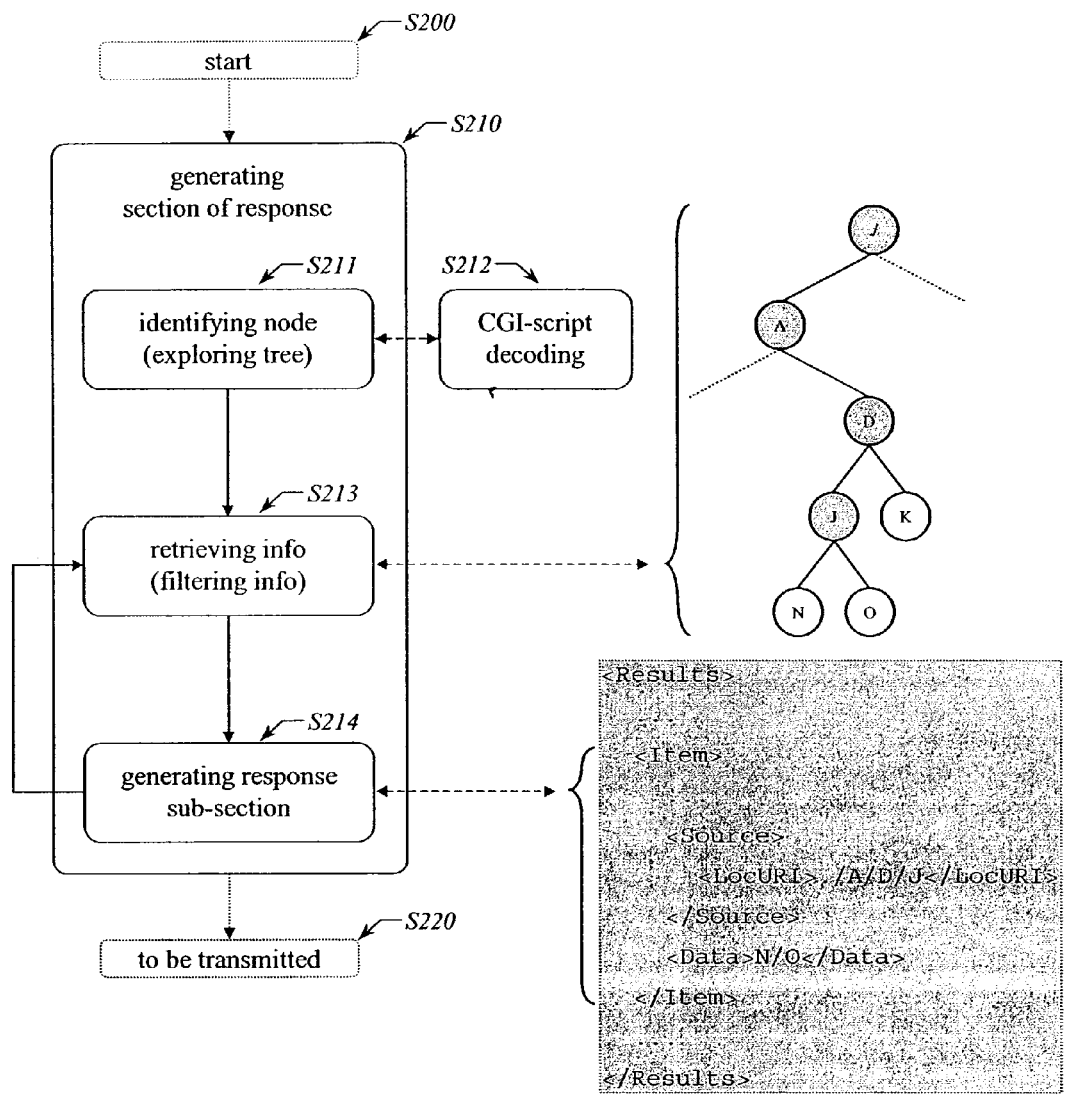
FIG. 4 shows a flow diagram illustrating the method for generating a response in accordance with a corresponding request according to an embodiment of the invention.

FIG. 4 shows a flow diagram illustrating the method for generating a response in accordance with a corresponding request according to an embodiment of the invention.

In an operation S200, a generation of a response of a section of the response is started, respectively. Preferably, this response is initiated by a request of the kind described above with reference to FIG. 3. The response may be part of the management phase described with reference to FIG. 1. Advantageously, the request is package type 4 response.

A response in accordance with the SyncML DM protocol has to fulfill some structural requirements. Basically, such a request is divided into a header section and a body section in the same kind as described with reference to FIG. 3.

In an operation S210, the response or a section of the response is generated, respectively. The section relates to the results of an exploring of the management tree contained in the managed client device. Particularly, this concerning response section relates to the coding of the command response according to the inventive concept of the present invention. More particularly, this concerning response section relates to the coding of a modified GET command response. The basic GET command response is defined and provided by the SyncML DM protocol standard.

In an operation S211, the nodes which are to be explored are identified. The exploring of the tree starts at the node addressed basically in the corresponding request. In accordance with the exemplary request illustrated in FIG. 3 and the abstract management tree illustrated in FIG. 2b, the identified nodes to be explored are the nodes "./A/D", "./A/D/J", "./A/D/K", "./A/D/J/N" and "./A/D/J/O".

In an operation S212, the exploration of the nodes requires a prior decoding and parsing of the coded exploration related information and the filter information. Preferably, the exploration related information and the filter information are coded in the address information addressing a node of the management tree, i.e. in the TARGET address of GET command contained in the request. Advantageously, the exploration related information and the filter information are provided as a CGI-script sequence which is parsed and analyzed by a corresponding CGI-script.

The exploring of the management tree starting from the basically addressed node is performed in combination with the results of the CGI-script execution. A set of exemplary parameters of the script sequence is described with reference to FIG. 3 and the coding of the request according to an embodiment of the invention.

In an operation S213, the information is retrieved from an identified node. The information to be retrieved is defined by the exploration related information which may be parsed and analyzed by a CGI-script. As described with reference to FIG. 2a and FIG. 2b each node contains a plurality of properties which can be retrieved therefrom.

Additionally, the retrieved information from the identified nodes can be filtered in accordance with filter information defined in the corresponding response initiating request. The concept of the filtering is described in detail with reference to FIG. 3.

In an operation S214, the response or the section of the response is coded in accordance with the retrieved information of an identified node, respectively. The coding of the section is based on the SyncML DM protocol standard. That is, the coding is to be performed as if the coded information is requested and retrieved in combination with an unmodified GET command which addresses exactly the identified node. The coding of the retrieved information is included in an ITEM definition having an initial term "<Item>" and a final term "</Item>. The Item definition includes the retrieved information which are included as a DATA definition having an initial term "<Data>" and a final term "</Data> and further completing definitions satisfying and provided by the SyncML DM protocol standard.

The identified node is coded in a SOURCE definition based on the URI address definition. Accordingly, the SOURCE definition contains a LocURI definition which contains the URI address. The SOURCE definition is composed of an initial term "<Source>" and final term "</Source>" as well as the LocURI definition composed of an initial term "<LocURI>" and final term "</LocURI>".

The exemplary excerpt presented in FIG. 4 shows the names of the sub-nodes of the identified node J, i.e. the URI address of the node J is coded as "./A/D/J" relative to the root node. The retrieved names of the sub-nodes are "N" and "O" contained in the DATA definition as plain text information. These sub-nodes N and O of the node J can be also identified in the part of the management tree depicted additionally in FIG. 4 and based on the management tree depicted in FIG. 2b.

The operations S213 and S214 can be iterated for each identified node of the management tree, i.e. identified in accordance with the exploring related information of the request initiating such a request response. The retrieving of the information from the identified nodes can also be effected completely before coding the response sub-sections in accordance with the retrieved information.

In an operation S220, the generating or coding of the request response is finalized, e.g. in accordance with the SyncML DM protocol standard. Further responses or even commands can be included in the response. The finalized response is to be transmitted to the management server.

The description of the operations S210 to S214 will be added in combination with two examples basing on corresponding request.

A first example bases on following request:

```
<Get>
    <CmdID>4</CmdID>
    <Item>
        <Target>
            <LocURI>./A/D?list=Tree</LocURI>
        </Target>
    </Item>
</Get>
```

The request indicates to retrieve the names of all nodes (compare parameters describe with reference to FIG. 3) which are arranged subordinately to the node D addressed by the means of the URI address "./A/D" relative to the root node.

The resulting request response in accordance with the first exemplary request and in accordance with the management tree depicted in FIG. 2b has the following content:

```
<Results>
    <CmdRef>4</CmdRef>
    <CmdID>7</CmdID>
    <Item>
        <Meta>
            <Format xmlns='syncml:metinf'>node</Format>
            <Type xmlns='syncml:metinf'>text/plain</Type>
        </Meta>
        <Source>
            <LocURI>./A/D</LocURI>
        </Source>
        <Data>J/K</Data>
    </Item>
    <Item>
        <Meta>
            <Format xmlns=' syncml :metinf ' > node</Format>
            <Type xmlns=' syncml :metinf ' > text/plain</Type>
        </Meta>
        <Source>
            <LocURI>./A/D/J</LocURI>
        </Source>
        <Data>N/O</Data>
    </Item>
</Results>
```

The resulting response contains two item entries, wherein a first item entry is dedicated to node D indicated by the source address "./A/D" coded as a URI address and relative to the root node. The retrieved information can be seen within the DATA entry indicating that the node D has two subordinate nodes J and K. The second item entry id dedicated to node J indicated by the source address "./A/D/J". The retrieved information indicates that the node J has also two subordinate nodes N and O. No further entries are contained in the response since the nodes K, N and O are leaf objects having no sub-nodes.

A second example bases on following request:

```
<Get>
    <CmdID>4</CmdID>
    <Item>
        <Target>
            <LocURI>./A/D?list=title</LocURI>
        </Target>
    </Item>
</Get>
```

The request indicates to retrieve the title (human readable names of the nodes, compare parameters describe with reference to FIG. 3) of all nodes which are arranged subordinately to the node D addressed by the means of the URI address "./A/D" relative to the root node.

The resulting request response in accordance with the second exemplary request and in accordance with the management tree depicted in FIG. 2b has the following content:

```
<Results>
    <CmdRef>4</CmdRef>
    <CmdID>7</CmdID>
    <Item>
        <Meta> . . . </Meta>
        <Source> <LocURI>./A/D</LocURI> </Source>
        <Data>title of node D</Data>
    </Item>
    <Item>
        <Meta> . . . </Meta>
        <Source> <LocURI>./A/D/J</LocURI> </Source>
        <Data>title of node J</Data>
    </Item>
    <Item>
        <Meta> . . . </Meta>
        <Source> <LocURI>./A/D/K</LocURI> </Source>
        <Data>title of node K</Data>
    </Item>
    <Item>
        <Meta> . . . </Meta>
        <Source> <LocURI>./A/D/K/N</LocURI> </Source>
        <Data>title of node N</Data>
    </Item>
    <Item>
        <Meta> . . . </Meta>
        <Source> <LocURI>./A/D/K/O</LocURI> </Source>
        <Data>title of node O</Data>
    </Item>
</Results>
```

The resulting response contains an item entry for the directly addressed node D and each subordinately arranged node (nodes J, K, N, O, respectively) contained in the management tree of FIG. 2b. The data entries of each item is dedicated to the title of each contained and identified node. Parts of the coded response which are out of the scope the present invention has been omitted.

Figure 5:
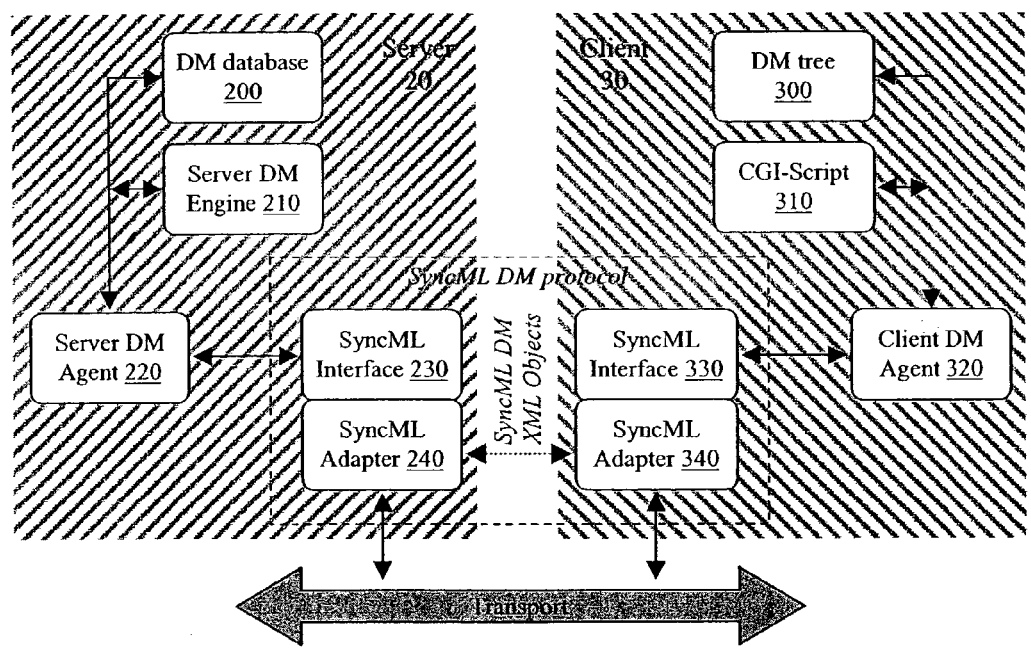
FIG. 5 shows a block diagram illustrating devices containing components for operating the aforementioned methods according to embodiments of the invention.

FIG. 5 shows a block diagram illustrating components for operating the aforementioned methods according to embodiments of the invention. A server device management agent 220 represents a networked service that provides device management with another counterpart client device management agent 320. The device management data may be provided or processed by the server device management agent 220 or client device management agent 320, respectively. The server device management agent 220 is hosted by the server 20 which may be a server device corresponding with the server device mentioned with reference to FIG. 1. Analogously, the client device management agent 320 is hosted by the client 30 which may be a client device corresponding with the client device mentioned with reference to FIG. 1. The device management is performed between a server 20 and a client 30.

The server 20 and client 30 are connected over any network. The network provides a logical communication connection between the server 20 and client 30, allowing the establishment of the end-to-end communication during the device management which may be termed as device management session. A selection of logical connections and bearers thereof are described in FIG. 1.

The client 30 may use the client device management agent 320 to access the network and send messages to the server via the synchronization adapter 340 and synchronization interface 330 in accordance to the SyncML DM protocol standard. The server 20 or server device management 220, respectively, receives or sends messages via the synchronization adapter 240 and synchronization interface 230, and manages the entire device management process through the server device management engine 210. Device management operations are conceptually bound into a device management frame, which is a conceptual frame for one or more required packages.

The server device management engine 210 has the possibility to access an adapted device management database 200 containing information about the client 30 to be managed such as the part of the management tree defined and provided by the manufacturer or information about the actual position within the management tree of the client. Further, the server device management engine 210 of the server 20 is able to generate the device management documents exchanged with the client 30, especially the server device management engine 210 able to generate a request described with reference to FIG. 3.

The counterpart client 30 is able to respond to the management request employing the client device management agent 320. Especially, the client device management agent 320 has access to the device management tree 300 and a CGI-script executing component 310 which is responsible for decoding/parsing related information contained in requests as described with reference to FIG. 3 and to provide the identified nodes to the client device management agent 320 for retrieving the requested information, for filtering if necessary and for coding the corresponding response to the request.

The presented components of the server 20 or the client 30, respectively, the server device management agent 220, the server device management engine 210 and the device database 200 respectively, as well as the client device management agent 320, the CGI-script executing component 210 and the device management tree 200, respectively, may be constituted by a data processing device which may be comprised by the server 20 or the client 30, respectively. Further these components may be constituted by a code section for executing on the server 20 or the client 30, respectively, containing instructions for carrying out the necessary processing operations.

Finally, the presented methods according to embodiments of the invention and with respect to the inventive concept provide several advantages to device management, especially to device management in accordance with the SyncML DM protocol standard. The combination of the two basic methods according to embodiments of the invention clearly reduces the package roundtrips of the packages type 3 and packages type 4, so that the amount of data exchanged in parallel is decreased enormously, i.e. saves time and costs of a user employing device management. The provided solution based on the inventive concept can be implemented without making unnecessary and expensive changes.

It shall be noted that the description is given with respect of a client device to be managed and a server device managing the client device. Advantageously, within the scope of the invention, it is also possible to extend the inventive concept to a client device generating a request of the described type for retrieving information from a management tree contained in the server device and to extend analogously the inventive concept to a server request generating a corresponding response caused by such an aforementioned request. This allows a client device to explore the management tree dedicated to the client device and contained in the server device in an analogous efficient, fast, cost and time saving way.

The respective components necessary to operate the methods according to embodiments of the invention and designated to the client device and server device with reference to FIG. 5 have to be implemented (also) within the particular device, i.e. the specific method related components of the client device in the server device and vice versa.

It will be evident for those skilled in the art that as the technology advances, the inventive concept can be implemented in a broad number of ways. The invention and its embodiments are thus not limited to the examples described above but may vary within the scope of the claims.

The invention claimed is:

1. Method for generating a request for obtaining at least a part of management related information of an electronic device, wherein said management related information is distributed among a plurality of nodes arranged as a hierarchical structure, at least one of said nodes is associated with a certain part of said management related information, wherein said request is generated by coding an address information identifying a selected node of said plurality of nodes and
   coding a command for instructing retrieval and return of said part of management related information in said selected node,
and wherein said request additionally contains information relating to said hierarchical structure of said plurality of nodes connected to said selected node, and a command for instructing an exploration of said hierarchical structure starting from said selected node and including a defined number of hierarchical levels, an identification of nodes within said hierarchical structure relative to said selected node and retrieval and return said management related information distributed in said identified nodes.

2. Method according to claim 1, wherein said plurality of identified nodes are nodes arranged hierarchically subordinate or hierarchically superordinate relative to said selected node.

3. Method according to claim 1, wherein said information relating to said hierarchical structure comprises filter information in order to instruct selective retrieval of management related information and in order to instruct return of said selectively retrieved management related information.

4. Method according to claim 1, wherein said address information contains said information relating to said hierarchical structure.

5. Method according to claim 4, wherein said information relating to the hierarchical structure is an instructional sequence for decoding by means of a common gateway interface script.

6. Method according to claim 1, wherein said request is based on a synchronization markup language protocol and especially is based on a synchronization markup language device management protocol.

7. Method according to claim 6, wherein said command of said request is a modified GET-command including said address information within a TARGET element containing a modified location uniform resource identifier.

8. Method for generating a response containing management related information in response to receipt of a request for at least a part of said management related information from a requesting electronic device, wherein said management related information is distributed among a plurality of nodes arranged as a hierarchical structures, where at least one of said plurality of nodes is associated with a certain part of said management related information, wherein said request comprises an address information identifying a selected node of said plurality of nodes, a command for instructing retrieval and return of said part of management related information in said selected node, additional information relating to said hierarchical structure of said plurality of nodes connected to said node, and a command for instructing an exploration of said hierarchical structure starting from said selected node and including a defined number of hierarchical levels, and wherein said response is for transmission to said requesting electronic device, said method comprising:
   retrieving a part of management related information associated with one selected node identified by an address information provided by said request,
   generating said response containing said retrieved part of management related information,
   identifying nodes relative to said selected node on the basis of information related to said hierarchical structure of a plurality of nodes connected to said selected node provided by said request,
   additionally retrieving parts of management related information associated with said identified nodes, and
   adding said additionally retrieved parts of management related information to said response.

9. Method according to claim 8, wherein said request is generated by:
   coding an address information identifying a selected node of said plurality of nodes and
   coding a command for instructing retrieval and return of said part of management related information in said selected node, and
   wherein said request additionally contains information relating to said hierarchical structure of said plurality of nodes connected to said selected node, and a command for instructing an exploration of said hierarchical structure starting from said selected node and including a defined number of hierarchical levels, identifying nodes within said hierarchical structure relative to the selected node and for retrieval and return said management related information distributed in said identified nodes.

10. Method according to claim 8, wherein said plurality of connected nodes are nodes arranged hierarchically subordinate or hierarchically superordinate relative to said selected node.

11. Method according to claim 8, wherein said information relating to said hierarchical structure comprises filter information in order to selectively retrieve management related information from said identified nodes.

12. Method according to claim 8, wherein said address information contains said information relating to said hierarchical structure.

13. Method according to claim 8, wherein said information relating to the hierarchical structure is an instructional sequence for decoding by means of a common gateway interface script.

14. Method according to claim 8, wherein said response is structured in a plurality of sections and each of said plurality of sections contains retrieved management related information of one node.

15. Method according to claim 8, wherein said response is based on a synchronization markup language protocol and especially is based on a synchronization markup language device management protocol.

16. Method according to claim 15, wherein said response contains a RESULTS element containing a plurality of ITEM elements, wherein each of said plurality of ITEM elements contains management related information of one identified node.

17. Method according to claim 16, wherein said each of said plurality of ITEM elements are coded as if a request response to a GET-command has been generated addressing said respective node corresponding to an ITEM element.

18. Software tool for handling management related information, comprising program code portions for carrying out the operations of claim 1, wherein said program code portions are embodied in a computer readable storage medium for execution by a computer, a user terminal or a network device.

19. Computer program product for handling management related information, comprising program code section stored on a computer readable medium for carrying out the operations of claim 1, wherein said program product is run on a computer, a user terminal or a network device.

20. Computer program product for handling management related information, comprising program code sections stored on a computer readable medium for carrying out the method of claim 8, wherein said program product is run on a computer, a user terminal or network device.

21. A device, comprising computer-readable storage medium embodying computer program codes therein for generating a request for at least a part of management related information of a request receiving electronic device, wherein said management related information is distributed among a plurality of nodes arranged as a hierarchical structure, at least one of said plurality of nodes is associated with a certain part of management related information, wherein said computer program codes comprising:
  instructions for coding an address information identifying a selected node of said plurality of nodes,
  instructions for coding a command for instructing retrieval and return of said part of management related information associated with said selected node,
wherein said component for generating said request additionally comprises
  instructions for coding an information relating to said hierarchical structure of a plurality of nodes connected to said selected node, and
  instructions for coding a command instructing an exploration of said hierarchical structure starting from said selected node and including a defined number of hierarchical levels, identifying nodes within said hierarchical structure relative to said selected node and for retrieval and return said management related information distributed in said identified nodes.

22. The device according to claim 21, wherein said computer program in said device
  generates said request by coding an address information identifying a selected node of said plurality of nodes and
  coding a command for instructing retrieval and return of said part of management related information, and wherein
  said request additionally contains information relating to said hierarchical structure of said plurality of nodes connected to said selected node, and a command for instructing an exploration of said hierarchical structure starting from said selected node and including a defined number of hierarchical levels, identifying nodes within said hierarchical structure relative to the selected node and for retrieving and return said management related information distributed in said identified nodes.

23. A device, comprising computer-readable storage medium embodying computer program codes therein for generating a response containing management related information in response to receipt of a request for at least a part of said management related information from a requesting electronic device, wherein said management related information is contained in said device and is distributed among a plurality of nodes arranged as a hierarchical structure, where at least one of said plurality of nodes is associated with a certain part of said management related information, wherein said computer program codes comprising:
  instructions for retrieving a part of management related information associated with one selected node identified by an address information provided by said request,
  instructions for generating said response containing said retrieved part of management related information,
  instructions for identifying nodes relative to said selected node on the basis of information related to said hierarchical structure of a plurality of nodes connected to said selected node provided by said request, wherein said request instructs an exploration of said hierarchical structures starting from said selected node and including a defined number of hierarchical levels,
  instructions for retrieving and returning additionally parts of management related information associated with said identified nodes, and
  instructions for adding said additionally retrieved parts of management related information to said response,
  wherein said response is for transmission to said requesting electronic device.

24. The device according to claim 23, wherein said computer program codes further comprises a common gateway interface script decoding program codes for decoding an instructional sequence based on a common gateway interface script instruction, wherein said instructional sequence contains said information relating to said hierarchical structure of said plurality of nodes connected to said selected node.

25. The device according to claim 21, wherein said computer program codes further comprises instructions for generating a response to said request by:
  retrieving a part of management related information associated with one selected node identified by an address information provided by said request,
  generating said response containing said retrieved part of management related information,
  identifying nodes relative to said selected node on the basis of information related to said hierarchical structure of a plurality of nodes connected to said selected node provided by said request in an exploration of said hierarchical structure starting from said selected node and including a defined number of hierarchical levels,
  additionally retrieving parts of management related information associated with said identified nodes, and
  adding said additionally retrieved parts of management related information to said response.

26. Method for obtaining at least a part of management related information of an electronic device, wherein said management related information is distributed among a plurality of nodes arranged as a hierarchical structure, where at least one of said nodes is associated with a certain part of said management related information, wherein said method comprises:

generating a request for obtaining said part of management related information by coding an address information of a selected node of said plurality of nodes coding a command for instructing retrieval and return of said part of management related information, wherein said request additionally contains information relating to said hierarchical structure of said plurality of nodes connected to said selected node, generating a response containing management related information associated with said selected node identified by the address information provided by said request, identifying nodes relative to said selected node on the basis of information related to said hierarchical structure of said plurality of nodes connected to said selected node, wherein said nodes are identified by exploring said hierarchical structure starting from said selected node and includes a defined number of hierarchical levels, retrieving parts of management related information associated with said identified nodes, and adding said additionally retrieved parts of management related information to said response.

* * * * *

UNITED STATES PATENT AND TRADEMARK OFFICE
CERTIFICATE OF CORRECTION

PATENT NO. : 7,269,821 B2
APPLICATION NO. : 10/422015
DATED : September 11, 2007
INVENTOR(S) : Sahinoja et al.

It is certified that error appears in the above-identified patent and that said Letters Patent is hereby corrected as shown below:

Column 19, line 67, claim 8, line 6 "structures" should be --structure--.

Column 20, line 8, claim 8, line 14 before "node" --selected-- should be inserted.

Column 21, lines 41 and 42, claim 21, lines 15 and 16 "wherein said component for generating said request additionally comprises" should be deleted.

Column 21, line 49, claim 21, line 24 "for" should be deleted.

Column 23, line 3, claim 26, line 10 after "nodes" --,-- should be inserted.

Signed and Sealed this

Fourth Day of March, 2008

JON W. DUDAS
*Director of the United States Patent and Trademark Office*